United States Patent [19]

Kunz et al.

[11] Patent Number: 4,842,773

[45] Date of Patent: Jun. 27, 1989

[54] METHOD OF PRODUCING A SOLID PRODUCT CONTAINING CEMENT FOR STORING TRITIUM WATER IN AN ACCESSIBLE TERMINAL STORAGE FACILITY

[75] Inventors: Willfried Kunz, Garbsen; Winfried Gramatte, Wölfersheim; Rolf-Erhard Schmitt, Nackenheim; Udo Pohl, Hofheim, all of Fed. Rep. of Germany

[73] Assignees: Deutsche Gesellschaft für Wiederaufarbeitung von Kernbrennstoffen mbH; Hanover Battelle Institut E.V., Frankfurt, both of Fed. Rep. of Germany

[21] Appl. No.: 132,412

[22] Filed: Dec. 14, 1987

[30] Foreign Application Priority Data

Dec. 17, 1986 [DE] Fed. Rep. of Germany ....... 3642975

[51] Int. Cl.$^4$ .......................... G21F 9/16; G21F 9/02; C04B 7/02
[52] U.S. Cl. .................................. 252/628; 252/630; 252/633; 106/97
[58] Field of Search ............... 252/626, 628, 630, 633; 250/506.1; 106/88, 97; 55/66

[56] References Cited

U.S. PATENT DOCUMENTS

| | | | |
|---|---|---|---|
| 3,749,917 | 7/1973 | Kucherer | 252/633 |
| 4,113,504 | 9/1978 | Chen et al. | 106/97 |
| 4,363,757 | 12/1982 | Koster et al. | 252/628 |
| 4,379,081 | 4/1983 | Rootham | 252/628 |
| 4,416,810 | 11/1983 | Noakes | 252/628 |
| 4,424,903 | 1/1984 | Knieper et al. | 252/633 |
| 4,454,062 | 6/1984 | Penzhorn | 252/630 |
| 4,528,129 | 7/1985 | Manchak | 252/628 |

FOREIGN PATENT DOCUMENTS 2917060 10/1983 Fed. Rep. of Germany .

*Primary Examiner*—Howard J. Locker
*Attorney, Agent, or Firm*—Walter Ottesen

[57] ABSTRACT

The invention is directed to a method for producing a cement product for the terminal storage of tritium water wherein activated bentonite capable of swelling is dispersingly mixed with the tritium water and the suspension obtained thereby is subjected to a swelling operation. The swollen suspension is dispersingly mixed with cement. The cured product has a water content of over 75% by weight.

22 Claims, 2 Drawing Sheets

METHOD OF PRODUCING A SOLID PRODUCT CONTAINING CEMENT FOR STORING TRITIUM WATER IN AN ACCESSIBLE TERMINAL STORAGE FACILITY

FIELD OF THE INVENTION

The invention relates to a method for producing a suitable solid product containing cement for terminally storing water containing tritium (tritium water) wherein the tritium water is mixed with cement and bentonite. The tritium water is mixed with bentonite, which is capable of swelling, to produce a water-bentonite suspension. The suspension obtained in this manner undergoes a swelling operation and thereafter cement is added to the swollen suspension.

BACKGROUND OF THE INVENTION

German Pat. No. 29 17 060 describes a method for solidifying tritium water. A minimum density of 0.3 grams/cm$^3$ is a boundary condition for the product to be cured. The basis for the formulation used in the above reference is a mixture of cement, bentonite and tritium water. The method described and the product correspond to laboratory experiments.

An attempt was made to produce a product for terminally storing tritium water on the basis of the formulation of the above-mentioned German Pat. No. 29 17 060. When translating this mixture developed in the laboratory to a semi-technical scale (university experiments and in the technical scale of 1:1), it was shown however that the terminal storage of the tritium water is not possible because the requirements imposed on large containers having an interior volume of approximately 8 m$^3$ could not be fulfilled. These requirements include a solid product having the highest possible water content and no residual water. All large specimens which were produced having a water content of more than 60% by weight have residual water during and after curing. Such an occurrence is not permissible for the terminal storage, for example, in a terminal storage mine according to the requirements of the authorities empowered to grant a permit for this purpose.

On the other hand, a content of water below 60% is not worthwhile in view of economic considerations.

SUMMARY OF THE INVENTION

It is an object of the invention to provide a method of the kind described above with which a solid product can be produced containing cement and which is suitable for terminal storage. It is a further object of the invention to provide such a solid product which has a higher water content without the danger of residual water being present.

The method of the invention is for producing a solid product containing cement for terminally storing tritium water. The method according to the invention includes the steps of: feeding tritium water and activated bentonite capable of swelling to a dispersion pump wherein high shearing forces are developed; dispersingly mixing the tritium water and the bentonite in the dispersion pump by subjecting the tritium water and the bentonite to high shearing forces to obtain a suspension thereof; subjecting the suspension to a swelling operation; and, admixing cement with the swollen suspension.

Thus, it is a feature of the invention that the activated bentonite, which is capable of swelling, is dispersingly mixed with the tritium water under the action of high shearing forces and the suspension obtained in this manner is subjected to a swelling operation.

Thus, in the method of the invention, activated bentonite capable of swelling is utilized. In activated bentonite, the earth alkali ions built into the crystal lattice are for the most part replaced by sodium ions. This can be obtained with a chemical treatment.

The bentonite is dispersingly mixed and sheared with the tritium water under the action of high shearing forces and thereby opened. The grain aggregate of the bentonite is substantially entirely mechanically broken up by means of the shearing forces to form a suspension. The suspension obtained in this manner is thereafter subjected to a swelling operation and then mixed with cement.

The above method steps advantageously make it possible to produce a product with approximately 85 to 90% by weight of water content without residual water having been detected.

Pursuant to an advantageous embodiment of the invention, the tritium water is dispersingly mixed with the bentonite in a mass ratio range of approximately 10:1 to approximately 20:1. Preferably, this mass ratio is approximately 12.5:1. This ratio is higher than previously obtained in the state of the art described above.

In a discontinuous method, the tritium water-bentonite suspension is subjected to the swelling operation in a swelling container. For this purpose, it is advantageous to circulate the suspension in the swelling container. In a continuous method, the tritium water-bentonite suspension passes through a retention segment which effects a hold-up time of at least 10 minutes. In this way, an adequate bentonite swelling is obtained.

In a further advantageous embodiment of the invention, the swollen suspension is mixed with a cement which contains only a small portion of calcium or releases only a small quantity of calcium ions. In this way, a deactivation of the bentonite is prevented.

In still another advantageous embodiment of the invention, the swollen suspension is dispersingly mixed with the cement under the action of high shearing forces whereby an additional break up of the suspension and an improved homogenization of the solid product are obtained.

The product is still capable of flowing and can be filled into a gas-tight container. A filling level of at least 92% by volume can be obtained without additional technical assisting means. Since no residual water occurs, present day official requirements for the terminal storage in an accessible terminal storage facility can be fulfilled.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
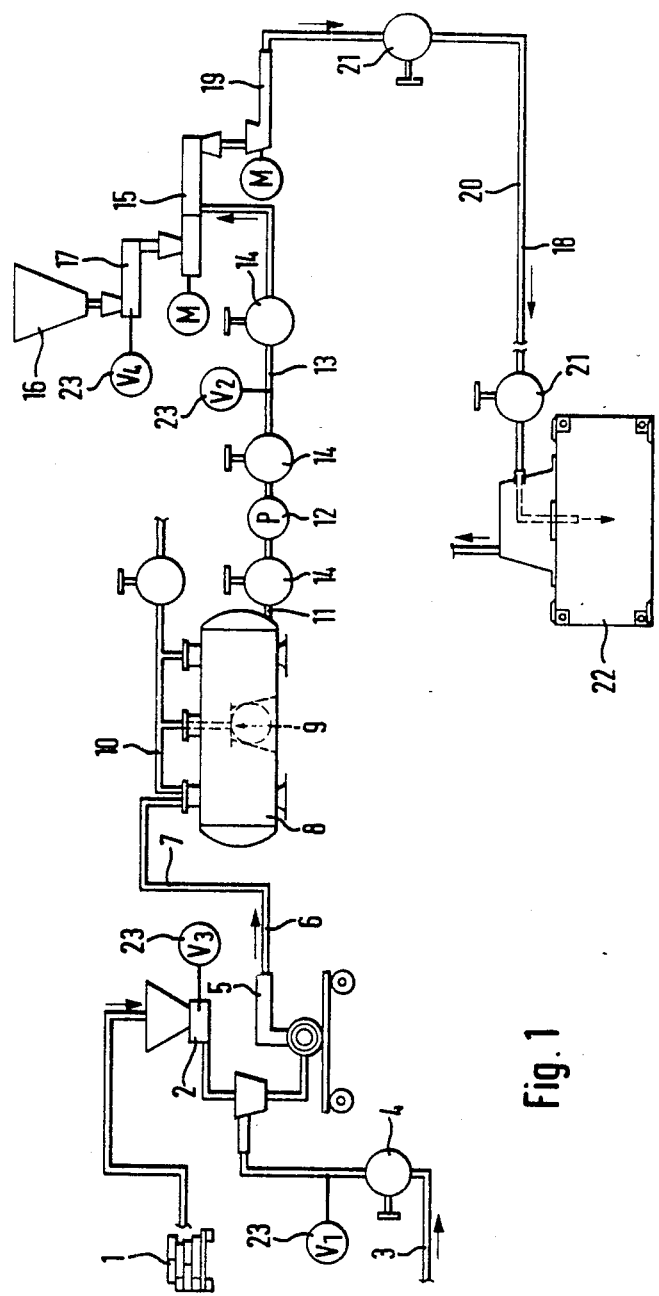
FIG. 1 is a process diagram showing the discontinuous production of a bentonite-cement-water mixture for terminally storing tritium water in an accessible terminal storage facility; and, FIG. 2 is a process diagram for the continuous production of a bentonite-cement-water mixture for terminally storing tritium water in an accessible terminal storage facility.

In the process diagram shown in FIG. 1, the bentonite 1 passes via a solid material metering device 2 into a dispersing pump 5 and the radioactive water 3 is passed into the pump 5 via a control valve 4. The dispersing pump 5 develops high shearing forces and the two materials bentonite 1 and the radioactive water 3 are mixed in the pump. A bentonite-water suspension 6 produced in this manner is pumped via a conduit 7 into a swelling container 8. The suspension 6 remains in the swelling container 8 between 5 and 25 hours to obtain an optimal absorption of the water by the bentonite. To obtain an improved handling of the thixotropic suspension 6, a circulation with a circulating pump 9 is provided via a circulating line 10.

The configuration of the swelling container and of the circulating operation can be varied and can be determined in correspondence with the conditions present at a particular facility and to obtain an optimization of the process. As an alternative, a standing cylindrical container equipped with a stirring unit could be used, for example. After the required swelling time, the bentonite suspension 11 is pumped with the aid of a conduit pump 12 functioning as a metering pump to a mixing device 15 via a conduit 13 equipped with appropriate conduit components 14. Cement 16 is added to the swollen bentonite suspension in the mixing device 15 via a metering device 17. All dry-wet mixing systems are suitable as a mixing device which provide an optimal mixing of both components (bentonite-suspension and cement) such as a screw mixer or dispersing pump.

The finished mixed product 18 is pumped into a terminal storage container 22 for curing with the aid of a solid-material pump 19 via a conduit 20 having components 21. The terminal storage container is gas-tight after the charging opening has been welded. The measurement positions 23 shown make possible a balancing of the mass currents.

Figure 2:
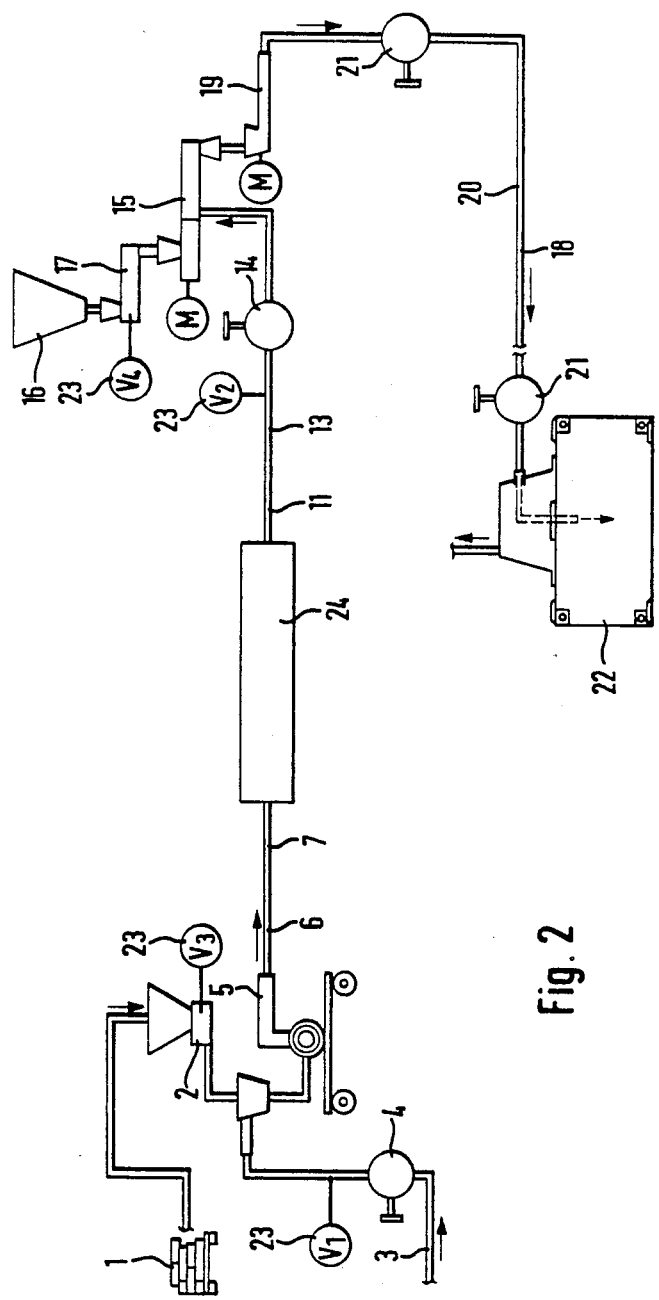

FIG. 2 shows a process diagram for providing a continuous process operation. The swelling container 8 utilized in the discontinuous process as well as the components (9, 10, 12, 14) of FIG. 1 are replaced in FIG. 2 by a retention segment 24. Experiments have shown that a hold-up time in the retention segment of greater than 10 minutes changes the characteristics of the swollen bentonite suspension 11 such that no residual water occurs in the end product 18 after hardening. The shorter swelling time requires an extended hardening time of the product.

During a six-week experimental phase, reproducible products were produced with both methods which had a water content of up to 90% by weight without residual water occurring after hardening.

For products having a water component portion of 85% corresponding to a volume portion of 93.5%, 80 kg of activated bentonite and 95 kg of portland blast-furnace cement were mixed with 1000 liters of water. The cement is known commercially in Germany as HOZ 35L-NW-HS (DIN). A standardized terminal storage container with a net volume of 7 m$^3$ was filled up to 92% with the product.

It is understood that the foregoing description is that of the preferred embodiments of the invention and that various changes and modifications may be made thereto without departing from the spirit and scope of the invention as defined in the appended claims.

What is claimed is:

1. A method of producing a solid product containing cement for terminally storing tritium water, the method comprising the steps of:
   feeding tritium water and chemically activated bentonite capable of swelling to a dispersion pump wherein high shearing forces are developed;
   applying high shearing forces to said tritium water and activated bentonite to dispersingly mix said tritium water and said bentonite in said dispersion pump to break up the grain aggregate of said bentonite and obtain a suspension of tritium water and bentonite;
   subjecting said suspension of tritium water and bentonite to a swelling operation; and,
   admixing cement with the swollen suspension.

2. The method of claim 1, wherein the tritium water and the bentonite are dispersingly mixed in a mass ratio in the range of approximately 10:1 to approximately 20:1.

3. The method of claim 2, wherein said mass ratio is approximately 12.5:1.

4. The method of claim 2, wherein said suspension is subjected to said swelling operation in a swelling container.

5. The method of claim 4, wherein said suspension is circulated in said swelling container.

6. The method of claim 1, wherein the water-bentonite suspension runs through a retention segment during a continuous through flow, said retention segment effecting a hold-up time of at least ten minutes.

7. The method of claim 1, wherein the swollen suspension is mixed with cement containing only a small portion of calcium.

8. The method of claim 7, wherein said swollen suspension is dispersingly mixed with said cement under the action of high shearing forces.

9. The method of claim 1, wherein the swollen suspension is mixed with cement releasing only small portions of calcium ions.

10. The method of claim 9, wherein said swollen suspension is dispersingly mixed with said cement under the action of high shearing forces.

11. A method of producing a solid product for terminally storing tritium water, the method comprising the steps of:
    adding the tritium water to chemically activated bentonite capable of swelling, in a weight ratio in the range of approximately 10:1 to approximately 20:1, the tritium water being added in such a quantity that said solid product has a water content of over 75% by weight;
    applying high shearing forces to said tritium water and said chemically activated bentonite to dispersingly mix said tritium water and said bentonite to break up the grain aggregate of said bentonite and form a suspension thereof;
    subjecting the suspension to a swelling operation for a predetermined period of time; and then
    adding cement to the suspension and mixing the cement and the suspension together; and,
    filling the mixed cement and suspension into a terminal storage container.

12. The method of claim 11, wherein the tritium water is dispersingly mixed with the bentonite in a mass ratio in the range of approximately 10:1 to approximately 20:1.

13. The method of claim 12, said mass ratio is approximately 12.5:1.

14. The method of claim 11, wherein the suspension is circulated in a swelling container.

15. The method of claim 11, wherein the water-bentonite suspension runs through a retention segment during a continuous flow, the retention segment effecting a hold-up time of at least ten minutes.

16. The method of claim 11, wherein the swollen suspension is mixed with cement containing only a small portion of calcium.

17. The method of claim 16, wherein said swollen suspension is dispersingly mixed with said cement under the action of high shearing forces.

18. The method of claim 11, wherein the swollen suspension is mixed with cement releasing only small quantities of calcium ions.

19. The method of claim 18, wherein said swollen suspension is dispersingly mixed with said cement under the action of high shearing forces.

20. A solid product for terminally storing tritium water, the solid product comprising:
a tritium water and bentonite suspension obtained by feeding tritium water and chemically activated bentonite capable of swelling to a dispersion pump wherein high shearing forces are applied to dispersingly mix said tritium water and said bentonite to break up the grain aggregate of the bentonite whereafter said suspension is subjected to a swelling operation; and,
cement admixed with the swollen suspension.

21. The solid product of claim 20, wherein said cement and activated swellable bentonite contain tritium water of over 75% by weight.

22. The solid product of claim 20, wherein said swollen bentonite contains said tritium water of approximately 85% to 90% by weight.

* * * * *